UNITED STATES PATENT OFFICE.

MAX SCHROEDER, OF HAMBORN, GERMANY, ASSIGNOR OF TWO-THIRDS TO THE ACTIEN-GESELLSCHAFT FÜR ZINK-INDUSTRIE, VORMALS WILHELM GRILLO, OF OBERHAUSEN, GERMANY, AND AUGUST HECKSCHER, OF NEW YORK, N. Y.

PROCESS OF COMBINING GASES BY CONTACT PROCESS.

SPECIFICATION forming part of Letters Patent No. 636,924, dated November 14, 1899.

Application filed October 19, 1898. Serial No. 694,019. (No specimens.)

*To all whom it may concern:*

Be it known that I, MAX SCHROEDER, a German subject, residing at Hamborn, Rheinland, Germany, have invented certain new and useful Improvements in the Recovery of Sulfuric Acid and Sulfuric Anhydride; and I do hereby declare the following to be a full, clear, and exact description of the invention, such as will enable others skilled in the art to which it appertains to make and use the same.

The present invention relates to the art of recovering sulfuric acid or sulfuric anhydride ($SO_3$) by the catalytic or contact method, wherein, as is well known, platinum has shown itself as an especially effective substance over all others for producing the desired result.

Inasmuch as platinum, even in finely-divided condition, is of too small volume to act effectively throughout in a large current of gases containing sulfurous anhydride ($SO_2$) and oxygen, resort was soon had to the expedient of superimposing the metal upon an inert or comparatively inert base, so as to spread the metal out over a large surface. Pumice-stone was at first proposed for this purpose and appeared especially applicable thereto on account of its numerous cavities. Winkler developed the subject further and ascertained that almost all loosely porous bodies are adapted to serve for the contact substance proper, especially asbestos, and also mineral wool, infusorial earth, clay, and (in so far as in certain contact processes no high temperature is required) even organic fibrous materials. In German Patent No. 4,566 Winkler describes a special process for the chemical application of platinum upon these bases, which process he likens to the final step in the dyeing of a fiber in the dye-vat. Moreover, from later publications it appears that for the production of these platinized contact bodies there has always been employed a base either molded to shape or otherwise in integral or solid condition.

The present invention contemplates the subdivision or dilution of the platinum in a different manner and by other means, whereby in a very simple way contact masses of extraordinary subdivision may be obtained, which far exceed in efficiency those heretofore employed.

Instead of the solid or integral bases hereinbefore referred to employment is made of the soluble salts of the alkalies, of the alkaline earths, of the earths, and of the metals, which salts, for the production of the contact mass, are to be dissolved in water and then mixed with a solution of the finely-divided platinum salt. The mixture of the solutions is then to be evaporated and the resulting salt crusts dried and broken up to about a uniform granular size. The powder which is formed during this reducing or breaking-up operation is to be dissolved anew in water and treated as before until all of the material has been converted into an appropriate condition of grains or particles. This material is adapted directly for filling the cylinders or other apparatus employed in carrying out the contact process. The separation of the metallic platinum in the finest subdivision between the molecules of the salts serving as vehicles for the platinum takes place of itself upon heating—*i. e.*, upon the starting of the contact process.

It will be apparent that the salts serving as vehicles for the finely-divided platinum will only remain unchanged during the contact process provided they are either stable sulfates or provided they contain an acid which—as, for instance, phosphoric acid—is stronger at a low red heat than the sulfuric acid which forms during the process. Other salts—as, for instance, chlorids or carbonates—will at the beginning of the process be at once converted into sulfates with development of their acids. Inasmuch as this results for the most part in an alteration of the structure and injury to the firm cohesion of the individual pieces, it is advisable to employ stable salts from the beginning.

As an example of particular proportions for obtaining a contact mass involving my invention, but without in any way intending to limit myself thereto, I may state that in some instances the contact mass may be produced by dissolving in the smallest quantity of water one hundred pounds of sulfate of potassium, one hundred pounds of sulfate of magnesium, and one hundred pounds of sulfate of aluminium and adding to the solution ten pounds of chlorid of platinum, likewise dissolved in water, whereupon the mixture is evaporated, dried, and granulated, as described.

It will be understood that instead of the single salts mixtures thereof or double salts—as, for instance, alum—can be employed. Furthermore, instead of platinum other metals of the platinum group may be used, which, however, in view of their great rarity, come less into consideration in practice.

The technological advantages of this new contact material consist not only in the simple manner of producing it, but also in its highly superior efficiency. The platinum finds itself in a condition of extraordinarily-fine subdivision and appears to be effective in the interior of the pieces to a degree not less than in the exterior layers. This may be due to the great porosity produced by the driving off of the water of crystallization. The solubility of the salts within which the catalytic agent is occluded in contact bodies made in accordance with my invention is particularly of value when the ordinary furnace-gases from sulfur ores are employed for the contact process. Inasmuch as the furnace-gases even after purifying still contain traces of dust, the contact bodies in the course of time become covered with thick impenetrable layers, which diminish their efficiency. To lay bare the surface, it is only then necessary to stir the contact body in water and to evaporate the salt solution thus formed. The dust is thereby dispersed throughout the entire mass and can no longer diminish the penetrability of the surface. Finally, the dust may be readily separated from the platinum after dissolving out the salts which serve as the vehicle. For this purpose it is only necessary to boil with concentrated muriatic acid the slime which has been separated from the salt solution, whereupon the particles of dust pass into solution while the platinum-black remains behind in a pure condition.

Having thus described the invention, what I claim is—

1. The process of recovering sulfuric acid or sulfuric anhydride from gases containing $SO_2$ and $O$, which consists in passing said gases through a mass comprising a catalytic agent and soluble salts, substantially as described.

2. The process of effecting the chemical union of gases by catalysis, from a mixture of said gases together with accompanying impurities, and subsequently releasing the catalytic agent from its carrier or vehicle, which consists in passing said gases through a contact mass containing a catalytic agent and one or more soluble salts serving as a carrier or vehicle therefor, until the efficiency of the mass has become impaired by the action of the impurities thereon, and then dissolving out the said soluble carrier salts, thereby releasing the catalytic agent; substantially as described.

3. The process of effecting the chemical union of gases, by catalysis, from a mixture of said gases together with accompanying impurities, and subsequently releasing the catalytic agent from its carrier or vehicle and recovering it, which consists in passing said gases through a contact mass containing a catalytic agent and one or more soluble salts serving as a carrier or vehicle therefor, until the efficiency of the mass has become impaired by the action of the impurities thereon, then dissolving out the said soluble carrier salts, thereby releasing the catalytic agent, separating it from the solution, and then removing from it the impurities; substantially as described.

4. The process of producing a material suitable for use in catalysis, which consists in making a mixture containing a liquid, a platinum salt and one or more suitable soluble salts, evaporating the mixture and obtaining salt crusts therefrom, and reducing the platinum salt in the mass to the metallic state so as to leave it occluded therein in a state of fine subdivision; substantially as described.

5. The process of producing a material suitable for use in catalysis, which consists in making a mixture containing a liquid, a catalytic agent, and one or more suitable soluble salts, evaporating the mixture and obtaining salt crusts therefrom, wherein the said soluble salts serve as soluble carriers or vehicles for the catalytic agent, substantially as described.

In testimony whereof I affix my signature in presence of two witnesses.

MAX SCHROEDER.

Witnesses:
WILLIAM ESSENWEIN,
G. HARTMANN.